United States Patent

[11] 3,613,083

[72] Inventor Giovanni De Sandre
Sacile (Udine), Italy

[21] Appl. No. 719,936
[22] Filed Apr. 9, 1968
[45] Patented Oct. 12, 1971
[73] Assignee Ing. C. Olivetti C.S.p.A.
Ivrea, Italy
[32] Priority Apr. 14, 1967
[33] Italy
[31] 51328/67

[54] TABULATING AND PRINTING OPERATIONS IN A PRINTING DEVICE FOR PROGRAM CONTROLLED ELECTRONIC COMPUTERS

10 Claims, 5 Drawing Figs.

[52] U.S. Cl. .......... 340/172.5
[51] Int. Cl. .......... G06f 3/10
[50] Field of Search .......... 101/93; 197/55, 19; 340/172.5

[56] References Cited

UNITED STATES PATENTS

| | | | |
|---|---|---|---|
| 2,853,696 | 9/1958 | Mendelson | 340/172.5 |
| 2,918,658 | 12/1959 | Hoberg et al. | 101/93 X |
| 3,135,195 | 6/1964 | Potter | 101/93 |
| 3,168,182 | 2/1965 | Bernard et al. | 197/55 |
| 3,260,340 | 7/1966 | Locklar et al. | 197/19 |
| 3,469,244 | 9/1969 | Perotto et al. | 340/172.5 |
| 3,245,043 | 4/1966 | Gaffney, Jr. et al. | 340/172.5 |
| 3,271,743 | 9/1966 | Craft et al. | 340/172.5 |
| 3,273,131 | 9/1966 | Strohm et al. | 340/172.5 |
| 3,374,467 | 3/1968 | Cast et al. | 340/172.5 |

*Primary Examiner*—Gareth D. Shaw
*Assistant Examiner*—Paul R. Woods
*Attorney*—Shoemaker & Mattare

ABSTRACT: A digital data processor controls an output printer, e.g. a typewriter, having selectively settable tabulation stops. These stops are set in accordance with instructions contained in the processor program preferably as a subprogram written in from a card. A plurality of such cards can be used to set up readily any desired tabulation format. The transmission of characters to the printer is controlled by a tag bit identifying the character to be printed. The invention further concerns means controlling the initial insertion of the tag bit, the shift of the tag bit from character to character and use of the tag bit to control carriage return and resumption of printing when the number of characters in a register exceeds the length of the printing line.

INVENTOR
GIOVANNI DE SANDRE
BY Shoemaker and Mattare
ATTORNEYS

INVENTOR
GIOVANNI DE SANDRE

BY Shoemaker and Mattare
ATTORNEYS

INVENTOR.
GIOVANNI DE SANDRE

BY Shoemaker and Mattare
ATTORNEYS

INVENTOR.
GIOVANNI DE SANDRE
BY Shoemaker and Mattare
ATTORNEYS

TABULATING AND PRINTING OPERATIONS IN A PRINTING DEVICE FOR PROGRAM CONTROLLED ELECTRONIC COMPUTERS

BACKGROUND OF THE INVENTION

The present invention relates to an electronic data processor controlled by a program formed by a series of instructions and comprising a printer. The term printer is used broadly to cover any device (including a typewriter or teleprinter) which produces a record of a line of characters, whether by means of type faces or not, as relative movement takes place between a part which produces the record and a part which carries that upon which the record is produced. The invention is concerned with control of the tabulation of the movable one of these two parts.

In some known processors of this type, the tabulating action of the movable part of the printer is controlled in accordance with a fixed format of plan determined by mechanical members programming the tabulation. For example, such a programming member may be constituted by a tabulating rod which can be scanned in synchronism with the movement of a movable part, for example the carriage of a typewriter (as described in U.S. Pat. No. 3,242,317).

In printing devices of this kind, the tabulation program cannot be influenced by the program controlling the processing of the data, for which reason the flexibility of the printing operations is generally inadequate.

In other known processors, for example of the type described in U.S. Pat. No. 2,946,504, the movable part of the printing device does not have a true and proper tabulating movement that is selectively controllable, but is capable of continuous cyclic advance along all the possible successive printing positions on a command from the internal-processing means, so that the printing format must be already preset in the internal store of the processor. This entails both an increase in the storage capacity required for the processor and the presence of complicated format-prearranging means.

SUMMARY OF THE INVENTION

The above-mentioned drawbacks are obviated by the processor according to the invention. The present invention provides a digital data processor controlled by a program formed by a sequence of instructions and comprising a printer provided with a movable part, wherein the tabulation of the movable part along at least one coordinate is determined by stop means adapted to be set selectively in predetermined stop positions and cooperating with means for effecting the tabulating movement, and wherein each of the stop means is adapted to be set under the control of an instruction of the said program.

In a preferred embodiment of the invention a group of instructions adapted to control the movable means for printing and for stopping the tabulating movement to obtain a predetermined format is entered in its store by inserting magnetic cards in a reading device, and that said cards can be recorded by said processor by an operation controlled from the keyboard of the machine, which transfers to the card a program previously entered in the store by means of said keyboard.

This tabulating system permits a very flexible connection between the processor and the external printer; it has a degree of automatic operation which can be adapted to the mechanical characteristics of the printer, because the tabulation is controlled by a plurality of instructions, each of which controls a particular moving or stop means. The data processor can be employed as a computing machine and as an accounting machine, for example a billing machine, because of the special flexibility associated with the presence of an internal program which can be entered from a magnetic card as well as from a keyboard and can be split up into subprograms which may be contained in individual magnetic cards or called for automatically at various points of the same main program.

Other features of the invention concern the control of the extraction of the characters to be fed to the printer or other output device.

BRIEF DESCRIPTION OF THE DRAWINGS

The invention will be described in more detail, by way of example, with reference to the accompanying drawings, in which.

DESCRIPTION OF A PREFERRED EMBODIMENT OF THE INVENTION

Figure 1:
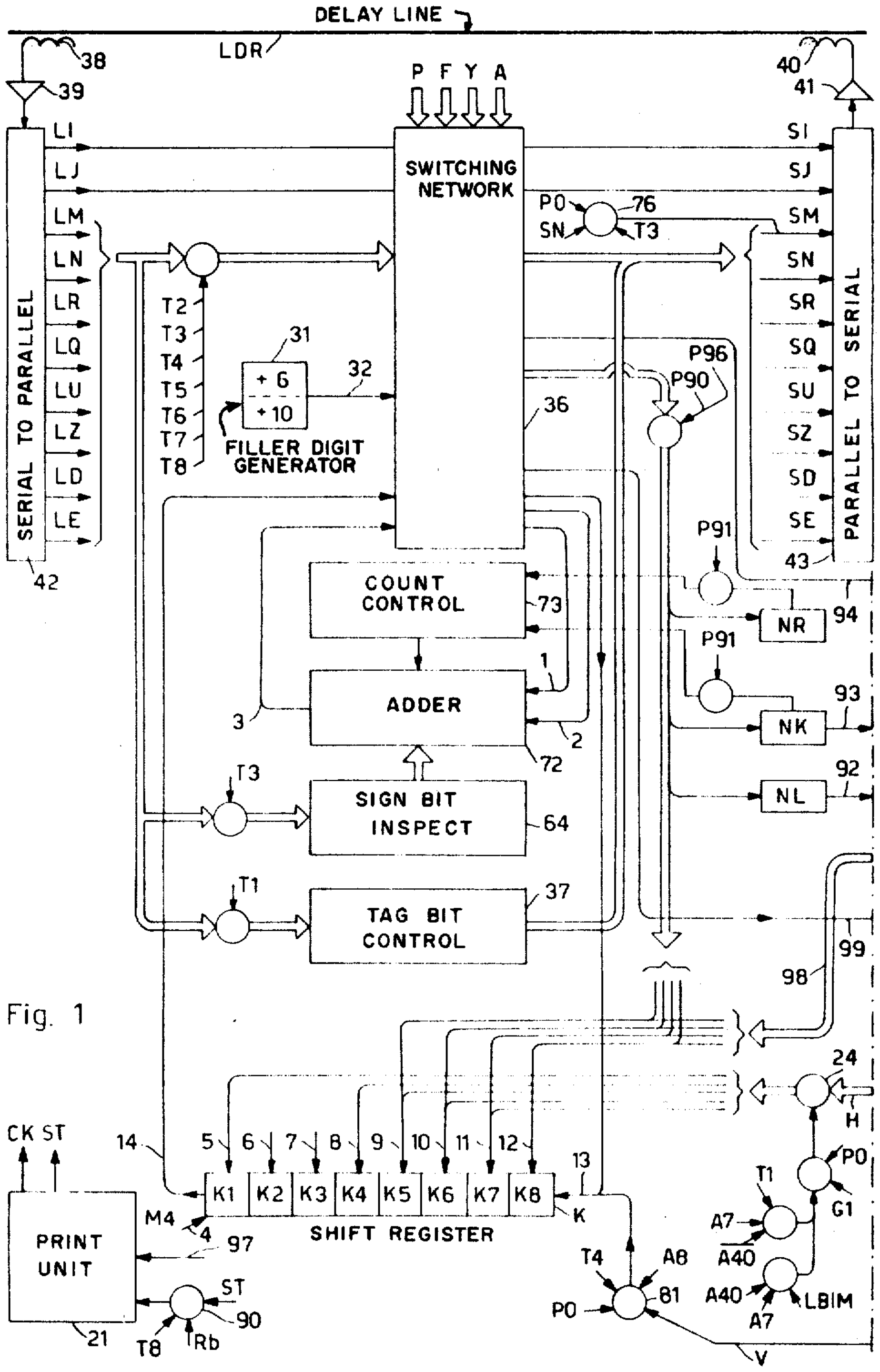
FIGS. 1 and 2 made up a block diagram of a data processor.

The data processor embodying the invention is a stored program electronic computer provided with a numerical and symbol keyboard, a first printing device, which will be referred to hereinafter as the internal printer, and a second printing device, which will be referred to hereinafter as the external printer, this being constituted, for example, by an electric typewriter with the function of a tabulator. Details of specific elements can be found in U.S. Pat. No. 3,495,222.

The use of the processor as a computer is characterized by the fact that it has at its disposal, inter alia, addition, subtraction, multiplication, division, square root and jump instructions and instructions for calling for subprograms with automatic modification of the address of reentry into the main program, and the program or part of it can be recorded on magnetic cards which can be introduced at predetermined points of the execution of the processing operation. The use of the processor as an accounting and billing machine is characterized, inter alia, by the possibility of storing constant data and intermediate resultant data of the processing operation, by the capacity to effect automatic computation of rounded-off percentage values, by the possibility of printing with a predetermined length and by the availability in the store of tabulation subprograms which can be selected automatically or be introduced by means of magnetic cards.

The computer according to the invention comprises (FIGS. 1 and 2) a store with a delay line LDR including, for example, 10 registers I, J, M, R, Q, U, Z, D, E and N and provided with a reading transducer 38 feeding a reading amplifier 39 and with a writing transducer 40 fed by a writing amplifier 41. The delay line can be a magneto-strictive delay line.

Each register comprises 32 decimal places each having eight binary places, whereby it is adapted to contain up to a maximum of 32 8-bit characters, both the characters and the bits being processed in series. Therefore, 10 . 8. 32 binary signals pass along the delay line LDR. The first 10 binary signals represent the first bit of the first decimal place of the registers R, N, M, J, I, Q, U, Z, D and E, respectively, the following 10 binary signals represent the second bit of the first decimal place of the same registers, respectively, and so on.

Assuming, for example, that the aforesaid binary signals are recorded in the delay line at intervals of 1 microsecond from each other, the signals belonging to a certain register will follow one another at intervals of 10 microseconds. In other words, to each register there belongs a train of 8. 32 binary signals spaced 10 microseconds from each other, the trains of signals belonging to the different registers being displaced by 1 microsecond.

The output of the reading amplifier 39 feeds a serial-to-parallel converter 42, which is adapted to make the 10 binary signals corresponding to the 10 registers available simultaneously at 10 separate outputs LR, LM. LN, LJ, LI, LE, LD, LQ, LU and LZ, respectively, whereby at a given instant the signals representing the first bit of the first decimal place of all the registers are present simultaneously at said outputs, 10 microseconds later the signals representing the second bit of the first decimal place are present simultaneously at said outputs, and so on.

Each group of 10 signals appearing in parallel at the outputs of the converter 42 is delivered, after being processed, to a parallel-to-serial converter 43 which is adapted to feed the writing amplifier 41 with said 10 signals disposed afresh in series and spaced from one another by 1 microsecond, whereby the transducer 40 records said signals, possibly modified according to the operations performed by the computer, in the store LDR, observing the original relative arrangement of said signals. It is therefore clear that the sole delay line LDR is equivalent, as regards the external circuits which process its contents, to a group of 10 delay lines operating in parallel, each containing a single register and provided with an output LR, LM, LN, LJ, LI, LE, LD, LQ, LU, and LZ, respectively, and with an input SR, SM, SN, SJ, SI, SE, SD, SQ, SU and SZ, respectively.

The aforesaid arrangement of the signals in the delay line enables all the registers of the computer to be disposed in a single delay line, with a single reading transducer and a single writing transducer and, therefore, at a cost not much greater than that of a delay line containing only one register. Moreover, as the pulse repetition frequency in the delay line is 10 times greater than in the processing circuits of the computer, it is possible to obtain at the same time a good utilization of the storage capacity of the delay line, while using relatively slow and, therefore, inexpensive switching circuits in the processing means.

Figure 4:
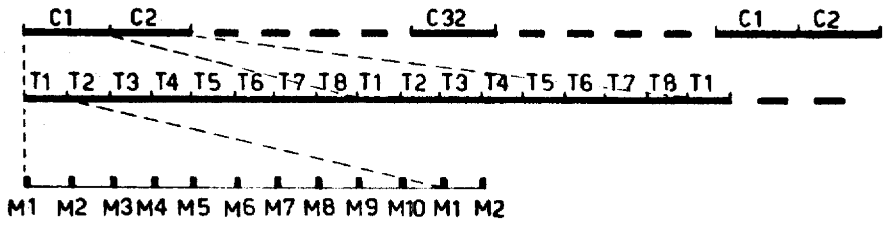
FIG. 4 shows the course in time of a number of signals present in the processor.
Figure 5:
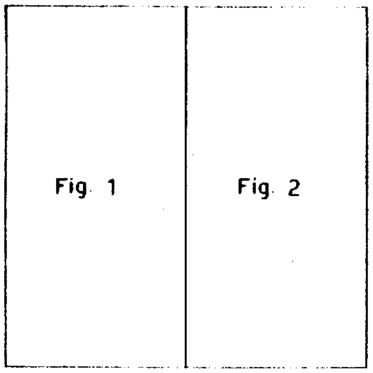
FIG. 5 is a diagram showing FIGS. 1 and 2 put together.

In view of the cyclic structure of the delay line store, the operation of the computer is divided into successive storage cycles, each cycle comprising 32 digit periods from C1 to C32 and each digit period being subdivided into eight bit periods from T1 to T8 (FIG. 4).

A timing signal generator 44 is adapted to supply at the outputs T1 to T8 successive time pulses, the duration of each of which indicates a corresponding bit period. In other words, the output T1 is rendered operative throughout the first bit period of each of the 32 digit periods, the output T2 is rendered operative similarly through the second bit period of each of the 32 digit periods and so on.

The time signal generator 44 is synchronized with the delay line LDR in such manner that the beginning of the *n*th generic bit period of the *m*th generic digit period coincides with the instant when the binary signals representing the 10 bits read in the *n*th binary place of the *m*th decimal place of the 10 store registers begin to be available at the outputs of the serial-to-parallel converter 42. These binary signals last for the entire corresponding bit period. In the course of the same bit period, the 10 bits resulting from the processing of the aforesaid 10 bits are delivered to the parallel-to-serial converter 43 and are therefore recorded in the delay line.

More particularly, the generator 44 is adapted to supply 10 pulses M1 to M10 during each bit period. The pulse M1 defines the reading instant when the serial-to-parallel converter 42 begins to supply the bits appertaining to the present bit period, while the pulse M4 defines the writing instant when said bits are delivered to the parallel-to-serial converter 43 to be written in the delay line.

The generator 44 is constituted, for example, by an oscillator 45 which supplies pulses with the frequency of the aforesaid pulses M1–M10 to a pulse distributor 46, which feeds in turn a frequency divider 47 supplying the pulses T1–T8.

The oscillator 45 remains operative only while a bistable A10 is operative; bistable A10 is included in a group of bistables located in 25 (FIG. 2) and is controlled by signals recorded in the delay line LDR.

Each decimal place of the store LDR may contain either a decimal digit or an instruction. More particularly, the registers I and J, referred to as the first and second instruction registers, are intended to contain a program composed of a maximum of 64 instructions recorded in order in the 32 decimal places of the register I and the 32 decimal places of the register J.

The registers M, N and R are operative registers, the registers Z and U are adapted to contain only numerical data and the registers Q, D and E may contain either program instructions or numerical data. Moreover, the registers Q, U, Z, D, E may be divided into two parts to contain two numbers with a maximum of 15 digits; there are therefore 13 store addresses instead of eight when the capacity of said registers is limited to 15 decimal digits.

The program instructions of the present computer have a varying format. The basic format of an instruction is an 8-bit character capable of expressing an address by the first four bits and a function code by the second four bits.

Since each of the 16 binary codes of the function part is associated with a number of store addresses smaller than 16, the same 8-bit format is used to create new functions which characterize operations relative to present means of the computer or to extend the format of the instruction from 8 to 16 bits.

More particularly, there are these types of instruction format.

An instruction in accordance with the first format is constituted by eight bits B1 to B8 recorded in the binary places T1–T8 of a certain decimal place of the store, the last four of which bits are adapted to represent 14 possible function codes, while the first four bits are adapted to represent the store address on which said operation is performed.

To the first format there belong the arithmetical and transfer instructions, the instruction for printing numbers on the internal printer, in which instructions the address indicates the store register which is to be operated on, and jump instructions, in which the address defines a code of recognition of the instruction of arrival at the end of the jump in the range of the storage zone reserved for the program.

The most important instructions of the first format will be described briefly, the letter Y indicating the generic register addressed by the instruction:

F1.1. Addition: transfer the number contained in the register Y now selected to the register M, then add the contents of the register M to the contents of the register N and write the result in the register N, that is in symbolic form $Y \rightarrow M$, $(N+M) \rightarrow N$;

F1.2. Subtraction: similarly $Y \rightarrow M$, $(N-M) \rightarrow N$;

F1.3. Multiplication: similarly $Y \rightarrow M$, $(N \cdot M) \rightarrow N$;

F1.4. Division: similarly $Y \rightarrow M$, $(N:M) \rightarrow N$;

F1.5. Transfer from M: transfer the contents of the register M to the register Y now selected, that is in symbolic form $M \rightarrow Y$;

F1.6. Return to N: transfer the contents of the register Y now selected to the register N, and vice versa, that is in symbolic form $Y \rightarrow N$, $N \rightarrow Y$;

F1.7. Exchange: transfer the contents of the register Y now selected to the register N and vice versa, that is in symbolic form $Y \rightarrow N$, $N \rightarrow Y$;

F1.8. Print register: print the contents of the register Y now selected on the internal printer;

F1.9. Unconditional jump: jump to the instruction recognizable by means of the code Y now expressed by the address bits of the instruction;

F1.10. Conditional jump: jump to the instruction recognizable by means of the code Y now expressed by the address bits of the instruction if the contents of the register N are greater than zero.

An instruction in accordance with the second format is constituted by a pair of characters each of eight bits B1–B8 located in the binary places T1–T8 of a pair of adjacent decimal places of the store.

The most important instructions of the second format are the following two instructions:

F2.1. Modify the first instruction of the program. In this instruction, the first eight bits define the function code and the following eight bits the new contents of the first decimal place of the program zone of the store. By this instruction, there is generally transferred to the first decimal place of the storage zone reserved for the program a jump instruction coded in the eight binary places of the second character of the instruction.

This instruction is used essentially in reentry from a subprogram into the main program together with the instruction F3.1 of the third format, which controls an unconditional jump to the first instruction of the subprogram;

F2.2. Print on the external printer. In this instruction, the first eight bits define the function code and the address of the store register containing the data to be printed and the second eight bits specify the length of printing and other printing conditions, as will be seen hereinafter.

An instruction in accordance with the third format is constituted by eight bits B1–B8 recorded in the binary places T1–T8 of a certain decimal place of the store and collectively indicating a function code.

To the third format there belong special instructions which control, for example, transfer between prefixed logic means, the computation of percentages and tabulation.

Among the most important instructions, the following should be mentioned:

F3.1. Jump to the instruction contained in the first place of the first program register. This unconditional jump is used as a final instruction of a subprogram when it is desired to reenter the main program. This instruction operates in conjunction with the instruction F2.1 hereinbefore described, by which there is transferred to the jump address of the instruction F3.1 a jump instruction which enables reentry to be effected at the instruction of the main program following that to jump to the subprogram.

F3.2. Return to the beginning: this instruction controls the repositioning of the carriage of the external printer at the beginning of the line, or in general the repositioning of the movable printing assembly and the line-spacing;

F3.3. Partial return: this instruction controls in the external typewriter the prearrangement of the mechanical stop in an intermediate position of the printing line, the repositioning of the carriage or the movable printing assembly at said stop and line-spacing.

F3.4. Set horizontal tabulation stop: this instruction controls in the external printer the prearrangement of a mechanical stop for horizontal tabulation in the generic position of the carriage;

F2.5. Carry out horizontal tabulation: this instruction controls the tabulating movement of the carriage of the movable printing assembly as far as the first stop prearranged by the instruction F3.4;

F3.6. Print a comma (or stop): this instruction controls the printing of the comma (or stop) without any algebraic significance. Printing of the comma (or stop) without any algebraic significance is used, for example, for writing the date or English values.

Each decimal digit is represented in the computer by means of four bits B5, B6, B7, B8 according to the decimal binary code. These four bits are respectively recorded in the store LDR in the last four binary places T5, T6, T7 and T8 of a certain decimal place.

Moreover, in this decimal place, the binary place T4 is used to contain a decimal-point bit B4, which is equal to "0" for all the digits of a decimal number, except for the first whole digit after the decimal point; the binary place T3 is used to contain a sign bit B3, which is equal to "0" for all the digits of a positive decimal number and equal to "1" for all the digits of a negative decimal number; the binary place T2 is used to contain a digit bit B2, which is equal to "1" only for all the decimal digits of a number, being equal to "0" in any decimal place not occupied by a digit.

The complete representation of a digit in the store LDR therefore engages the binary places T2, T4, T5, T6, T7 and T8 of a certain decimal place. The remaining binary place T1, on the other hand, is used to contain a tag bit which need not have any relation to the decimal digit contained in the decimal place of the store.

More particularly, a bit B1R="1" recorded in the first decimal place C1 of the register R is used to start the time pulse generator 44 at the beginning of each storage cycle; a bit B1E="1" recorded in the 32nd decimal place C32 of the register E is used to arrest the generator; a bit B1N="1" recorded in the *n*th decimal place of the register indicates that during the execution of a program the next instruction to be carried out is that contained in the *n*th decimal place of the selected program register; a bit B1M="1" recorded in the *n*th decimal place of the register M indicates; during the introduction of a number from the keyboard into the register M, that the next digit entered is to be introduced in the (*n*-1)th decimal place; during the introduction of an instruction from the keyboard, that the next instruction is to be introduced in the *n*th decimal place of the selected program register; during the printing of a number contained in a selected generic register, that the next digit to be printed is that in the *n*th decimal place of said register; during the adding of two numbers, that that digit of the result which is recorded in the *n*th decimal place of the register N must thereafter be corrected by adding a predetermined digit; a bit B1Z="1" recorded in the decimal place C16 of the register Z constitutes a countersign which enables the registers Q, U, Z, D, E to be divided into two halves; a bit B1U="1" recorded in the *n*th decimal place of the register U indicates that the execution of a main program has been interrupted at the *n*th instruction of the register I or J to pass over to the execution of a subprogram. Therefore, the bits B1R, B1E, B1Z represent fixed reference points in the various registers; the bits B1N, B1M and B1U represent movable reference points; moreover, the bits B1M serve during addition to record for each decimal place a piece of information relating to an operation carried out in said place. The regeneration and modification (shifting) of said tag bit is effected by a tag-bit control circuit 37.

The computer moreover comprises a binary adder 72 provided with a pair of inputs 1 and 2 adapted to receive simultaneously two bits to be added, to supply the sum bit simultaneously at an output 3.

The computer is moreover provided with a shift register K comprising eight binary stages K1–K8. The register K, which is of a known type, is designed so that each time it receives a shift control pulse at a terminal 4 the bits contained in the stages K2, K3, K4, K5, K6, K7, K8 are transferred to the preceding stages K1, K2, K3, K4, K5, K6 and K7, respectively, and moreover the bits present at the inputs 5, 6, 7, 8, 9, 10, 11 12, 13 are transferred to the stages K1, K2, K3, K4, K5, K6, K7, and K8, respectively.

The shift control pulses are constituted by the pulses M4 and the register K therefore receives one of these pulses at each bit period, that is eight at each digit period. The contents of each stage of the register K remain unchanged from the pulse M4 of each bit period until the pulse M4 of the following bit period. It is therefore clear that a bit present at the input 13 of the register K during a certain bit period will reappear at the output 14 of said register after eight bit periods, that is delayed by a digit period, so that the register K behaves in this case like a section of delay line with a delay of the length of a digit period.

Connecting any particular selected register to the register K in a closed loop, leaving the other registers closed directly on themselves, is equivalent to lengthening it by one digit period with respect to said registers. If it is also agreed to define as the *n*th decimal place of the selected register that place which is read simultaneously with the *n*th decimal place of the other registers, that is during the *n*the digit period starting from the reading of the bit B1R starting the generator 44, it is clear that the contents of the selected register will then undergo a shift of one decimal place, that is a delay of one digit period with respect to the other registers, at each storage cycle.

Moreover, inasmuch as the register K functions as a delay line, it is adapted to form a counter according to the principles set forth on page 198 of the book "Arithmetic Operations in Digital Computers" R. K. Richards, 1955, if its input 13 and its output 14 are connected to the output 3 and the input 1, respectively, of the adder and the input 2 of the latter does not receive any signal, said counter being adapted to count successive counting pulses fed to the carry bistable, according to the rule specified hereinafter. Considering the eight bits contained in the register K as belonging to a number of eight binary places, a counting pulse can be fed to the carry bistable at the instant when the bit of lowest significance issues from the register K. The counting pulses will therefore have to follow one another at an interval of one digit period or of a multiple of one digit period. Count control circuit 73, which is described in detail in the aforementioned U.S. Pat. No. 3,495,222 (see particularly FIG. 4), supplies counting pulses to adder 72.

The register K is moreover adapted to function as a transfer store for temporarily containing a decimal digit, or the address part or function part of an instruction, for the purpose of controlling a printer for printing the digit or the address part or function part.

Finally, the register K is adapted to function as a parallel-to-serial converter in the transfer of data or instruction from a keyboard 22 to the store LDR, as described more fully in the above-mentioned U.S. Pat. No. 3,304,418.

The computer is moreover provided with an instruction staticizer 16 comprising eight binary stages I1–I8 adapted to contain the eight bits of an instruction, respectively.

The staticisor 16 transfers its contents to the decoder 17, which has outputs Y0, Y1–Y8, F1.1–F.14, F2.1–F2.4, F3.1–F3.13.

In the case where the instruction staticized in the staticizer 16 is of the first format, the inputs I1–I4 energize an output Y1–Y8 (associated or not associated with the output Y0 to indicate whether the registers Q, U, Z, D, E are to be regarded as divided or not). This output selects one of the eight store registers or, if the instruction is a jump instruction, specifies one of the jump codes, while the inputs I5–I8 indicate the function code through the medium of the decoder 17.

In the case where the instruction is of the second format, only the first character of the instruction is staticized in the staticizer 16. More particularly, if the instruction is an instruction F2.1 (modification of the first instruction of the program), only the output 2.1 of the decoder 17 is energized by the binary configuration of the bits T1–T8; if the instruction is an instruction F2.2 (printing on external printer), one of the outputs Y1–Y8, Y0 is energized by the bits T1–T4 to select the store register containing the data to be printed, while the bits I5–I8 energize the output F2.2 of the decoder 17.

In the case of an instruction of the third format, where the function code results from binary configurations of all eight bits of the instruction, only the outputs F3.1–F3.13 of the decoder 17, each corresponding to a special instruction, are energized.

Moreover, the outputs of the stages I1–I4 and the outputs of the stages I5–I8 can be connected through gates 19 and 20, respectively, to the respective inputs of the stages K5–K8 of the register K, for the purpose of printing by means of the internal printer the address and the function, respectively, contained in these stages.

A switching network 36, which is old in the art, is adapted to interconnect in various ways the store registers, the adder 72, the register K and the instruction staticizer 16, for the purpose of controlling the transfer of data and instructions between the various parts. It is therefore clear that there is also entrusted in particular to the switching network 36 the selection of the registers on the basis of the address supplied by the decoder 17. As explained in the aforementioned U.S. Pat. No. 3,495,222, filler digit generator 31 performs a radix correction function while sign bit inspection circuit 64 monitors the add-substract operations.

The keyboard 22 for entering the data and instructions and for controlling the various functions of the computer comprises in particular a numerical keyboard 65 having 10 numeral keys 0 to 9 by means of which it is possible to enter a number through the register M, which is the only one of the registers of the store LDR which is directly accessible from the numerical keyboard.

The keyboard 22 moreover comprises an address keyboard 68 provided with keys Q, U, Z, D, E, N, R, each of which controls the selection of the corresponding register of the store LDR.

Finally, the keyboard 22 comprises a function keyboard 69 provided with keys F1–F16, each of which corresponds to the function part of one of the instructions which the computer is able to execute.

The three keyboards 65, 68 and 69 control a mechanical decoder, which is old in the art, provided with code bars associated with electric switches which are adapted to supply on four lines H1, H2, H4 an equal number of binary signals representing the four bits of the decimal digit set up on the keyboard 65, or of the address set up on the keyboard 68, or of the function set up on the keyboard 69, said decoder being moreover adapted to energize the line G1, G2 or G3 to indicate that the setting up has actually been carried out on the keyboard 65, 68 or 69, respectively.

A decimal-point key 67 and a negative algebraic-sign key 66 directly produce a binary signal on the lines V and SN, respectively.

The computer is adapted to operate in three ways, namely "manual," "automatic" and "entering of program," according to whether a three-position changeover switch 23 generates a signal PM, PA or IP, respectively. All the aforementioned instructions can be executed by automatic operation and the majority also by manual operation.

More details concerning the logic sequence program, which the computer according to the invention interprets and executes the various instructions are serve to in U.S. Pat. No. 3,304,418. The following description relates to the instruction F1.8 for printing on the internal printer, the instruction F2.2 for printing on the external printer and the instructions F2.3, F3.2 .... F3.5 for tabulation on the external printer.

INTERNAL PRINTER

During the entering of the program, the signal IP being present, the address keyboard 68 and the function keyboard 69 serve to enter the various instructions of the program in the registers reserved therefor through the register K. To this end, the outputs H1–H4 of the keyboard can be connected, through a gate 24, to the inputs 8–11, respectively, of the register K. During this time the numerical keyboard 65 is inoperative.

During automatic operation, when the program entered in the store is executed, the address and function keyboards are inoperative.

Automatic operation comprises a sequence of instruction extraction and execution phases. More particularly, during a generic extraction phase, an instruction is extracted from the program registers and transferred to the staticizer 16; said phase is followed automatically by an execution phase in which the computer, controlled by said staticized instruction, executes said instructions, said execution phase having been completed, there follows automatically the next extraction phase, in which the next instruction is extracted from the program registers and staticized in place of the preceding instruction, and so on.

As long as an instruction remains staticized in the staticizer 16, the numerical store register indicated by the address part of the instruction remains continuously selected and, moreover, the decoder 17 continuously supplies the signal corresponding to the function part of the instruction. During automatic operation, the numerical keyboard is also normally inoperative, inasmuch as the computer operates on the data previously entered in the store, and said keyboard is used only when the program instruction staticized at the moment is a datum entering instruction F10. It is clear that this instruction makes it possible to operate by means of a certain program on a number of data greater than that which the store may contain initially.

Finally, during manual operation, all three keyboards, the numerical, the address and the function keyboards, are operative. More particularly, in this method of operation, the address and function keyboards may be used by the operator to cause the computer to execute a sequence of operations similar to that executed during automatic operation. To this end, the operator enters manually an address and a function, whereby these are staticized via gates 70 and 71, respectively, in the staticizer 16, similarly to what occurs in an instruction extraction phase during automatic operation. Said entering operation on the keyboard moreover starts an execution phase of the instruction entered in this way, this phase being similar to the executive phase in automatic operation, and when said execution phase has been completed the computer stops and waits for a new instruction to be set up.

Therefore, starting from right to left, the first vertical row of types on the cylinder comprises sixteen function symbols, the second vertical row comprises the eight letters Q, U, Z, D, E, M, N, R, and the eight letters *q, u, z, d, e, m, n, r*, respectively indicating the whole or divided store registers, the third vertical row is devoid of types and the following vertical rows are alike and comprise the 10 decimal digits with decimal point and minus algebraic sign.

These types or characters are disposed in such manner that, if the corresponding bits B5, B6, B7, B8 which represent them in the internal code of the machine are interpreted as representations of the numbers 0 to 15 in pure binary code, the successive types which are presented under the hammer in each column correspond to numbers decreasing from 15 to 0, and in such manner that the characters in the various vertical rows which are aligned on the same directrix of the cylinder correspond to the same number. Therefore, in the range of each vertical row, the characters are distinguishable simply by means of a counting, as will be seen hereinafter.

Fixed to the printer cylinder is a time signal generating disc which cooperates in manner which is known in the art with an electrical circuit to generate a signal CK shortly before the instant when each type of the cylinder arrives in the writing position in front of the hammer. This circuit is moreover adapted to generate a signal ST which, at each revolution of the cylinder, lasts for the whole of the time during which the arc occupied by the letters of the alphabet is located in front of the hammer, whereby the presence of the signal ST is adapted to supply at the beginning of the printing operation a synchronizing signal which permits the acceptance of the signals CK by the electronic means of the computer, while the absence of the signal ST indicates that fraction of a revolution of the cylinder during which the extraction of the next character to be printed from the store LDR or from the staticizer 16 is made possible.

The computer transmits a command to the movable printing device on the line 97 to start its movement along the type cylinder and transmits pulses via the gate 90 for controlling the striking of the hammer.

The advance of the hammer is continuous and independent of the striking action. The printing of each number terminates with the deenergization of the line 97, which produces the return of the hammer to the right-hand margin of the printing line.

The instruction F1.8 "Print on internal printer" is an instruction of the first format by which there is transferred to the internal printer 21 hereinbefore described the contents of a store register selected by the decoder 17 through the medium of the bits I1, I2, I3, I4 of the staticizer 16.

The printing of the number contained in the register proceeds from right to left and begins with the two alphabetic characters which respectively indicate the function symbol and the name of the register selected. These characters are followed by a space and thereafter by the digits of the number beginning from those which are least significant, with printing of the decimal point and, if appropriate, the minus algebraic sign.

On termination of the printing, automatic repositioning of the movable printing means (hammer) at the right-hand margin and line-spacing take place.

If the number to be printed is formed by more than 23 digits, which represent the maximum length of a line of print, the computer stops the printing sequence and creates the conditions adapted to produce the return of the hammer to the beginning, line-spacing and the positioning of the hammer below the least significant digit in the first line of print (fourth printing position), and then resumes the interrupted sequence.

Printing in accordance with the instruction F1.8 comprises various operative phases characterized by the states P17, P99, P100, P101, P103, P104, P105 and P106 of the machine.

In the state P17 of the machine, the instruction F1.8 is staticized in the register 16 and the outputs of the decoder 17 are energized and supply the decoded function and the decoded address of the store register containing the number to be printed.

The following functions are executed in the state P99 of the machine:

— alignment of the registers N and M at the least significant digit. This alignment is obtained by shifting the number contained in the registers until the least significant digit is brought into the first decimal place of said registers. The other store registers contain numbers already aligned at the least significant digit, since such alignment takes place automatically after the transfer of a number to said registers, — writing of the tag bit B1 in the register N to fix the number of decimals to be printed, that is to say to indicate the place in the store corresponding to the least significant character.

The place in the store where this tag is to be written is indicated by transferring the number contained in the decimal printing indicator 77 located at the side of the keyboard 22 to the register K closed on the adder 72 so as to form a counter, and counting the signals T5 of each digit period following that corresponding to the digit which contains the decimal point until the counter reaches the content 32.

The reaching of this number causing the writing of the tag bit B1 in the register N.

In the state P100 of the machine there is effected with the same counter formed by the register K and the adder 72 a count of 24 successive digit periods starting from that which corresponds to the tag bit 31 of the register N, for the purpose of indicating the place in the store at which the printing exceeds the maximum capacity of the line.

The count is effected by transferring the complement of 24 to 32 to the register K and counting the signals T5 of each digit period starting from that which corresponds to the tag bit B1 of the register N until the second zeroizing of the register K, at which the count stops and the tag bit B1 is written in the register M.

In the following state P101 of the machine, the execution phase of the printing is initiated. This proceeds in cycles synchronous with the advance of the movable printing means or member along a line parallel to the axis of the type cylinder.

In the state P101, the contents of the bistables I5, I6, I7, I8 of the register 16 are transferred to the bistables K5, K6, K7 and K8 respectively, of the register K closed on the adder 72 so as to form a counter for the signals CK delivered by the printer 21 in correspondence with the individual characters located in the first vertical row of the type cylinder.

The signal ST delivered by the printer to the counter indicates the time during which the arc occupied by the types remains below the printing hammer and permits the commencement of the count of the signals CK. The count stops with the zeroizing of the register K, which causes the striking of the hammer. More particularly, since the types or characters in a circumferential row of the cylinder correspond to binary configurations between 15 and zero, since the first signal CK is that corresponding to the code 15 and since the counter counts the signals CK and is initially charged with a binary configuration between zero and 15, the zeroizing of the register K produces the striking of the hammer on the character contained at the beginning of the count in the register K. The command for such striking, which is transmitted by the computer via the gate 90, is accompanied by the energization of the line 97, which starts the movements of said hammer.

Due to the synchronism existing between the rotation of the type cylinder and the advance of the hammer, the individual striking actions produce the line of print with the appropriate spacing of the characters.

In the state P102, the transfer of the contents of the bistables I1, I2, I3, I4 of the register 16 to the bistables K1, K2, K3 and K4, respectively, of the register K and the counting of the signals CK as in the preceding state P101 are effected. The striking of the hammer produces the printing of the character which indicates the register selected at the moment. In the same state P102 there is moreover effected a spacing of the print, which takes place automatically through the absence of signals CK in correspondence with the position occupied by the hammer during this cycle.

In the state P103, the transfer of the numerical characters to be printed to the register K is effected in successive cycles. For each character, the counter K counts the pulses CK and, at the end of the count, produces the striking of the hammer, which advances from right to left.

At each cycle, the tag bit B1 of the register N is shifted into the adjacent decimal place in the direction of scanning of the store. If the digit to be transferred to the register K from the store register selected at the moment contains the decimal-point bit B4, the printing sequence is modified by the presence of the new state P104 of the machine.

In the state P104, which lasts for one printing cycle, the transfer of the digit containing the decimal point to the register K is not effected and the tag bit B1 of the register N is not shifted. Instead, the binary configuration which produces the printing of the decimal point is transferred to the register K.

In the following cycle, the state P103 of the machine replaces the state P104 and the normal transfer of the characters from the register selected at the moment for printing and the advance of the tag bit B1 of the register N begin again. The last digit printed is that followed by the reading in the selected register of a store place without the tag bit B2, which accompanies the places in the register which are occupied by the digits of the number to be printed. The reading of a decimal place in the register without the tag bit B2 is signalled by an internal-condition bistable which produces the new state P105 of the machine.

In the state P105, the algebraic sign of the number is examined. If the sign is negative, there is transferred to the register K the corresponding binary configuration which causes, at the end of the count, the printing of the minus sign by the known methods; if the sign is positive, no printing is carried out. The stopping of the printing sequence is followed by the deenergization of the line 97, which produces the return of the hammer to its initial position in the right-hand margin. If the number to be printed in longer than 23 digits, the printing takes place in two lines. In correspondence with the store place in which the simultaneous reading of the tag bits B1 of the two registers N and M is obtained, the shifting of the bit B1 of the register N to the following decimal place is not effected and, moreover, the state P106 of the machine replaces the state P103.

In the state P106, return of the hammer and line-spacing are first produced by deenergization of the line 97, and thereafter the line 97 is energized again for advance of the hammer without printing.

After this movement, which positions the hammer below the least significant digit of the number in process of being printed, the state P103 again replaces the state P106 in the computer and resumes the normal sequence in accordance with the operating cycle hereinbefore described, whereby the remaining part of the number is printed.

EXTERNAL PRINTER

The external printer connected to the computer is provided with mechanical means for setting manually the left-hand and right-hand margins of the lines of print, a movable printing means and moving and stop means for tabulation.

Figure 3:
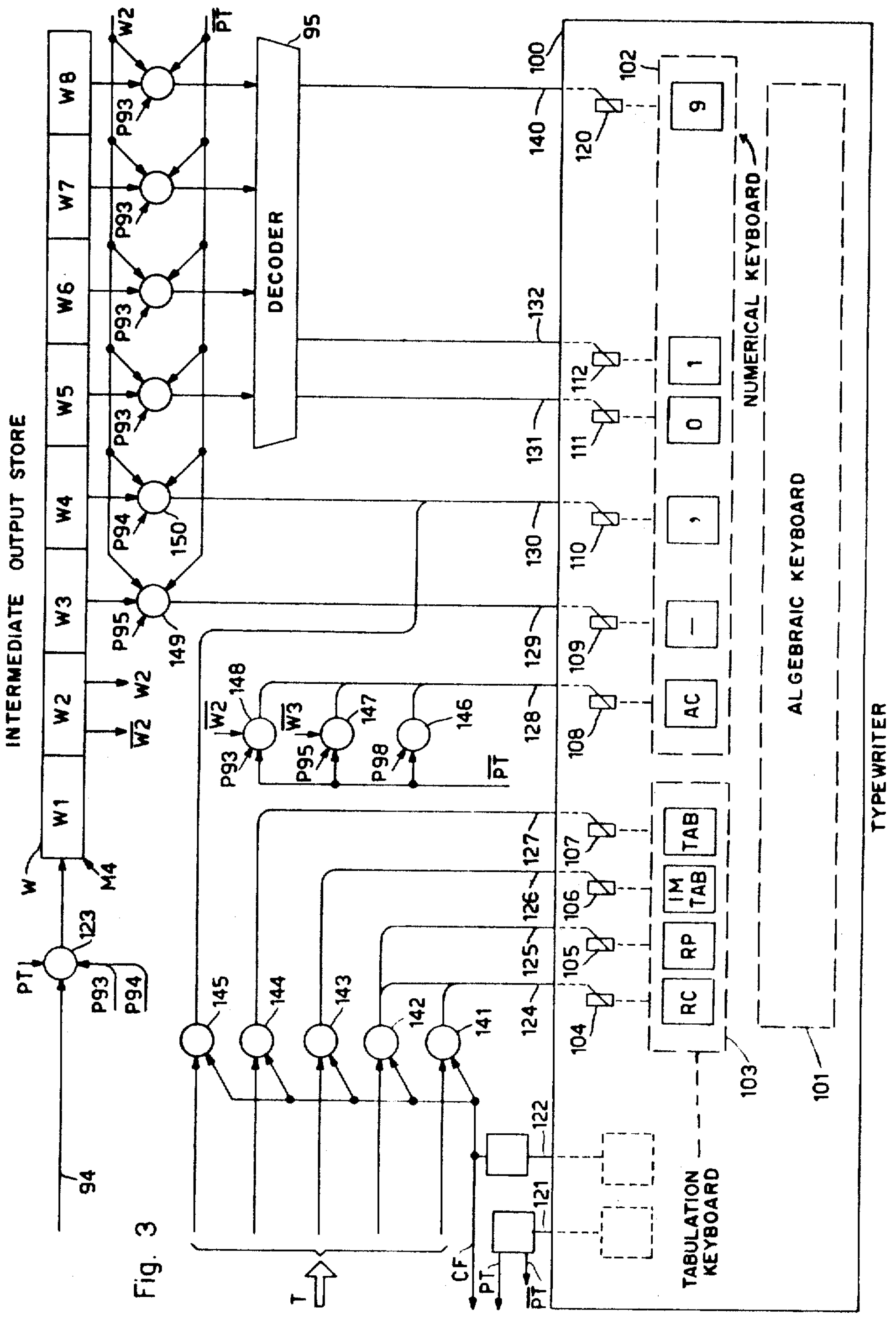
FIG. 3 is a block diagram of the connection of the processor to the printing unit.

More particularly, the external printer is constituted (FIG. 3) by a typewriter 100 with a moving carriage having tabulation means controllable manually through the keyboard or by a program by means of electromagnets 104–107 under the control of tabulation instructions.

The tabulation means enable the following to be effected:

— The return of the carriage to the left-hand margin stop and line-spacing under the command originating from the key RC or from the electromagnet 104 energized through a line 124.

— Presetting a tabulation stop to correspond with a predetermined intermediate position of the printing line, the positioning of the carriage at the said stop and line-spacing, all by means of the simultaneous actuation of the two keys RP and RC or by means of a command transmitted by the computer through lines 124 and 125 to the respective electromagnets 104 and 105. The presetting of the stop is rendered impossible when the carriage is positioned at the stop.

— Presetting a tabulation stop in a generic printing position by the actuation of the key IM-TAB or through the electromagnet 106 energized by a command transmitted by the computer on a line 126.

— Forward tabulating movement of the carriage as far as the first stop encountered by means of the actuation of the key TAB or through the electromagnet 107 energized by a command transmitted by the computer on a line 127.

The typewriter 100 is moreover provided with a numerical keyboard 102 comprising the numeral keys 0 to 9, the minus algebraic sign key, the comma or decimal-point key and the horizontal spacing key AC, each of which actuates the corresponding printing element in parallel with the commands transmitted by the computer to the typewriter via lines 131–140 and electromagnets 111–120, a line 129 and an electromagnet 109, a line 130 and an electromagnet 110 and a line 128 and an electromagnet 108, respectively.

The typewriter is moreover provided with an algebraic keyboard 101 and with a device comprising a single switch actuated in known manner by the mechanical means controlling the movement of the carriage and which is adapted to supply on a line 122 a signal indicating whether the carriage is moving or at a standstill.

The typewriter 100 is equipped with a main shaft which is in continuous rotation and which supplies in known manner the power required for the actuation of the various mechanical means in response to the commands, the printing of the successive characters being effected in successive cycles determined by the rotation of the main shaft. A signal generator, constituted, for example, by an electromagnetic transducer cooperating with magnetic poles located on a wheel rotating in synchronism with the shaft, is adapted to generate a signal on the line 121 at each cycle of the typewriter. This signal indicates to the electronic processing means the proper moment for the transfer of a character to be printed to the typewriter.

INSTRUCTION TO PRINT ON EXTERNAL PRINTER

The instruction F2.2 "Print on external printer" transfers the contents of a store register sequentially to the printing means or elements for a length (number of characters) determined by the printing instruction, proceeding from the most significant digits towards the least significant, with printing of the decimal point and, if necessary, the minus sign after the last digit. The maximum printing length is 32 digits, that is the entire contents of the store register selected by the instruction.

During the printing process, the successive decimal places of the store are transferred via a channel 94 to an intermediate output store W formed by eight bistables W1, W2, W3, W4 ...W8, and thereafter from this store to the typewriter 100, in reading-printing cycles synchronous with the mechanical cycle of the printer.

As has already been mentioned, the instruction "Print on external printer" has a two-character format of 16 bits which are read in two adjacent places of the program registers of the store.

The first eight bits select the register containing the characters to be printed and define the function code.

The second eight bits specify by the bits B1 and B2 the type of printing and by the bits B4–B8 the printing length.

Figure 2:
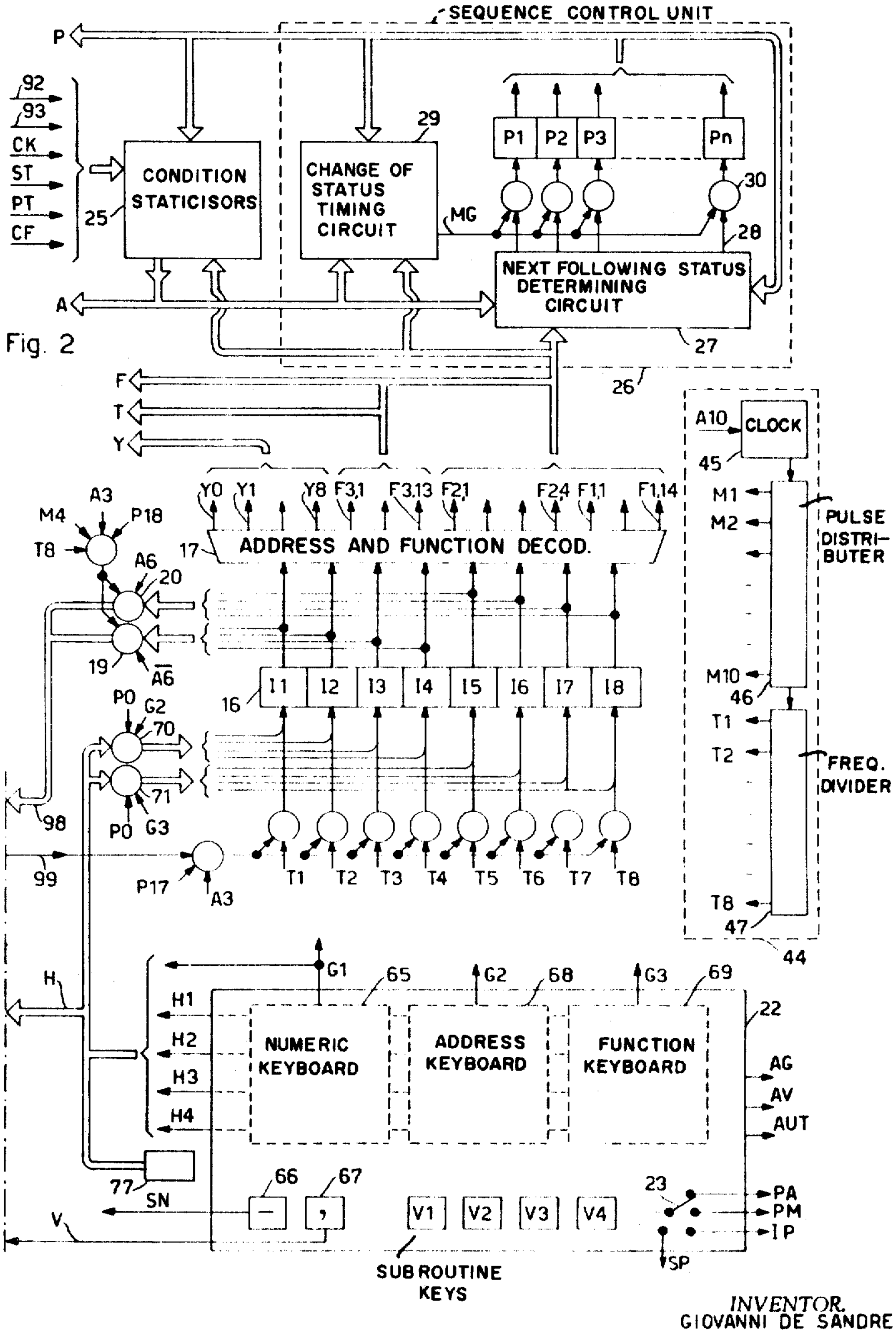

More particularly, the bits B1 and B2 respectively indicate whether the printing is to be effected in absolute values or with an algebraic sign, in respect of all the decimals of the number contained in the selected register or only in respect of the decimals preestablished by an indicator 77 for the number of decimals to be printed, which is arranged at the side of the keyboard (FIG. 2).

As has already been described in the section "General description," each store register has a length of 32 places scanned in series during each cycle of the store LDR.

In each of the said places, four numerical code bits are recorded in the binary places T5–T8, one sign bit is recorded in the binary place T3, a bit which gives the significance of a numerical digit to the contents of that decimal place is recorded in its binary place T2, while a decimal-point bit is recorded in the binary place T4 of the least significant whole digit.

Following the reading of the instruction "Print on external printer," a tag bit B1 is written in a predetermined register, for example N, in the binary place T1 of the decimal place which precedes (in the direction of scanning of the store registers), the decimal point of the number to be printed with the number of digits established by the indicator 77 for the decimals to be printed.

This tag bit indicates the end of the printing in the case where the instruction F2.2 requires a preestablished number of decimals to be printed.

Printing on the external printer comprises various operative phases characterized by the states P17, P90, P91, P92, P93, P94, P95 of the machine.

The phase of reading and interpreting the instruction comprises the states P17, P90, P91, P92, during which the following functions are performed:

State P17 — storage of the first character of the instruction in the register 16 and energization of the decoder 17, which delivers an output corresponding to the function and one for the selection of the store register with the switching network 36, through the agency of the second four bits and the first four bits, respectively, of said character.

State P90 — Alignment of the store registers N and M at the least significant digit, that is shifting of the number in the register until the least significant digit is brought into the first decimal place of the register. The other store registers contain numbers which are already aligned at the least significant digit, because this alignment takes place automatically after each transfer of a number to said registers.

— Writing of the tag bit B1 in the register N to establish the number of decimals to be printed. The place in the register N where the tag bit B1 is to be written is indicated by transferring the number contained in the indicator 77 for the number of decimals to be printed to the register K closed in the form of a counter on the adder 72, and then counting, at each digit period following that which indicates the decimal point of the number contained in the register selected at the moment, until the counter reaches the contents 32. The reaching of this number causes the writing of the bit B1 in the register N.

State P91 — storage of the type of printing in bistables NK and NL by means of the bits B1 and B2 of the second character of the instruction and storage of the printing length by putting the bit B4 in the bistable NR and the complement to 16 of the bits B5, B6, B7, B8 in the binary places K5, K6, K7 and K8, respectively, of the register K.

State P92 — closing of the register K on the adder 72 so as to form together with the bistable NR a counter counting up to 32. This counter counts the signals T5 of each digit period following the energization of the bistable NK. This bistable is energized in turn by the tag bit B1 of the second character of the instruction F2.2 if the printing is carried out for all the decimals, or by the tag bit B1 of the store register N (that is, the bit recorded in the state P90 hereinbefore considered) if the printing is carried out only for the decimals preestablished by the indicator 77 for the number of decimals (FIG. 2). In this way, the counting begins either in the first decimal place of the store registers or in that place where the reading of the tag bit B1 of the register N takes place.

If the bistable NR which stores the most significant bit of the printing length is deenergized, the counting stops with the first zeroizing of the register K, otherwise it continues with a new counting cycle and stops at the second zeroizing of the register K. In correspondence with the stopping of the count, a tag bit B1 is written in that decimal place of the register M which is indicated by the last count of the register K. It is therefore clear that, since each store register has a length of 32 digit periods, since the counter constituted by the register K, the bistable NR and the adder 72 has been initially charged with the complement to 32 of the number expressing the desired printing length, and since the aforesaid counter counts the successive digit periods in synchronism with the scanning of the store, the place in which the bit B1 is recorded is that where the printing must begin.

The phase of interpretation of the instruction F2.2 ends with the state P92 of the machine and the execution phase characterized by the states P93, P94, P95 begins. During the state P93 there is effected the transfer of the characters from the selected store register to the intermediate store W via the line 94, and from the store W to the printing means of the typewriter 100 through a decoder 95 and the lines 131–140. The printing of each character requires an internal operation cycle synchronous with the mechanical cycle of the printer. A bistable PT controlled by pulses delivered on the line 121 by a generator producing signals synchronous with the mechanical cycle of the typewriter 100 is energized and deenergized during the printing cycle of each character. The energization of the bistable PT produces the transfer to the intermediate store W of the character indicated in the register selected at the moment by the place of the tag bit B1 of the register M, and the shifting of said bit to the adjacent decimal place in the direction from the most significant digits to the least significant digits. The transfer of the character to the register W is effected bit by bit via the gate 123 at each pulse M4.

The deenergization of the bistable PT enables the transfer of the same character to be effected from the intermediate store W to the printing means via the decoder 95 and the lines 131–140.

The successive decimal places of the store register selected at the moment are indicated, for transfer of their contents to the store W, by counting cycles executed with the counter formed by the bistables K5, K6, K7, K8 of the register K closed on the adder 72 and which is controlled by the signal T5 of each digit period through the carry bistable of said adder. Each cycle of counting the digit periods begins with the register K zeroized and in correspondence with the decimal place following that indicated by the tag bit B1 of the register M.

The counter K moreover carries out a double count in correspondence with the first sexagesimal carry and stops in correspondence with the second sexagesimal carry. As the capacity of the store registers is 32 digits, the stopping of the counter K indicates the decimal place in the store which is adjacent that characterized by the presence of the tag bit B1 in the register M2 in the direction from the most significant digits to the least significant digits.

The tag bit B1 of the register M is shifted in correspondence with this decimal place for addressing the following character to be delivered to the intermediate store W. The characters printed are only those provided with the tag bit B2 which gives the significance of an operable character to the contents of the decimal place; the absence of the tag bit B2 produces the deenergization of the bistable W2 of the store W and control only of the spacing of the characters on the typewriter 100 via the gate 148 and the line 128.

The termination of the printing is conditioned by the printing conditions staticized in the bistable NK. If all the decimals of the number contained in the register selected are required, the printing terminates with the cycle following that in which the tag bit B1 of the register M reaches the first decimal place of the same register; if only the decimals selected by the indicator 77 for the decimals to be printed are required, the printing terminates with the cycle following that in which the tag bit B1 of the register M is aligned with the tag bit B1 of the register N.

The least significant digit of the whole portion of the number to be printed contains the decimal-point bit in the binary place T4.

The transfer of this digit to the intermediate store W, which is determined by the energization of the bistable PT, staticizes the decimal-point bit in the bistable W4. The reading of the decimal-point bit moreover creates an internal condition which prevents the shifting of the tag bit B1 of the register M to the adjacent decimal place of the store. On the deenergization of the bistable PT, only the contents of the bistables W5, W6, W7, W8 of the store W are transferred to the printing means through the decoder 95.

In the following cycle, the state P94 of the machine replaces the state P93.

During the state P94, which has a duration of a single printing cycle, the intermediate store W is charged with the same digit as in the preceding cycle owing to the tag bit B1 of the register M not having been shifted, while the counting of the register K and the shifting of the tag bit B1 in the register M are resumed. During the deenergization of the bistable PT, the state P94 determines the transfer of only the decimal-point bit to the printing means via the gate 150 and the line 130.

In the following cycles, which are again characterized by the state P93, normal transfer from the register selected at the moment to the intermediate store W and from the latter to the printing means is effected.

The omission or printing of the minus sign is controlled at the end of the numerical printing by the state of the bistable NL which stores the type of printing in absolute or algebraic value expressed by the bit B2 of the second character of the instruction F2.2.

The printing of the sign requires, after the cycle relating to the last digit, a further printing cycle characterized by the state P95 of the machine. If the sign is the + sign, the state P95 renders all the outputs of the store W inoperative and produces the transmission of the spacing command via the gate 147 and the line 128 so no sign is printed; if the sign is the − sign, the state P95 of the machine renders operative only the output W3, which directly controls the printing of the − sign via the gate 149 and the line 129.

The printing of the comma or point without any numerical significance takes place by means of the special instruction F3.6. In this case, the decoder 17 energizes the line 130 via the gate 145 with its output F3.6 on the channel T, to condition the execution of the printing in the state of rest of the movable means of the typewriter 100.

TABULATION OF THE EXTERNAL PRINTER

The tabulation program of the external printer is contained in the internal store of the computer and is formed by a plurality of special instructions which control the mechanical tabulation means.

More particularly, the computer is connected to the typewriter 100, the tabulation means of which can be controlled, as already described hereinbefore, by the keys of the keyboard 103 or alternatively, and at the choice of the operator, by the tabulation instructions, whereby there corresponds to the actuation of said keys a command transmitted from the computer on one of the lines 124–127 by means of an instruction of the third format, that is a special instruction without an address code.

More particularly, the tabulation instructions relating to the typewriter under consideration are as follows:

F3.2. Carriage return: repositioning of the carriage of the typewriter at the left-hand margin and line-spacing.

F3.3. Partial carriage return: presetting in the typewriter of a stop intermediate the two lateral margin stops of the printing line, positioning of the carriage at said stop and line-spacing.

F3.4. Set tabulation stop: presetting in the typewriter of a stop for the tabulating movement at a generic printing position.

F3.5. Horizontal tabulation: forward movement of the carriage of the typewriter as far as the first stop preset by the instruction F3.4 or manually.

Whenever one of the four instructions hereinbefore considered is staticized in the register 16, the energization of the corresponding output of the decoder 17 causes the energization, via the lines 124, 124 and 125, 126 and 127, respectively, of the corresponding electromagnets 104, 104 and 105, 106 and 107, respectively, which act in parallel with the keys RC, RC and RP, IM-TAB and TAB, respectively, of the typewriter 100.

The opening of the gates 141, 143, 143 and 144 interposed between the decoder 17 and the electromagnets is conditioned by the signal CF which indicates that the carriage is at a standstill.

The computer moreover has at its disposal the second-format instruction F2.3 "Tabulate step by step according to the length specified," which shifts the carriage for a length (number of characters) indicated by the instruction.

The instruction F2.3 is a two-character instruction in which the eight bits of the first character express the function code "-Tabulate step by step," and in which the bits T4–T8 of the second character indicate the tabulation length.

The interpretation and execution of the instruction F2.3 comprise altogether the operative phases characterized by the states P17, P96, P97, P98 of the machine.

The phase of reading and interpretation of the instruction comprises the states P17, P96, P97 of the machine.

In the state P17, the decoder 17 is energized and supplies an output corresponding to the function code expressed by the eight bits of the first character.

In the state P96, the tabulation length is stored by putting the bit B4 in the bistable NR and the complement to 16 of the bits B5, B6, B7, B8 in the binary places K5, K6, K7 and K8, respectively, of the register K (FIG. 1).

In the state P97, the register K is closed on the adder 72 so as to form together with the bistable NR a counter capable of counting up to 32. This counter counts the signals T5 of each digit period starting from that corresponding to the first decimal place of the store registers.

If the bistable NR which stores the most significant bit of the printing length is deenergized, the counting stops with the first zeroizing of the register K, otherwise it continues with a new counting cycle and stops at the second zeroizing of the register K.

In correspondence with the stopping of the count, a tag bit B1 is written in that decimal place of the register M which is indicated by the last count of the register K.

It is therefore clear that, since each store register has a length of 32 digit periods, since the counter formed by the register K, the bistable NR and the adder 72 has been initially charged with the complement to 32 of the number expressing the desired printing length, and since the aforesaid counter counts the successive digit periods in synchronism with the scanning of the store, the place in which the bit B1 is recorded is that where the tabulation must begin. The phase of interpretation of the instruction F2.3 terminates with the state P97 and the execution phase characterized by the state P98 begins.

The state P98 of the machine is characterized by cycles determined by the energization and deenergization of the bistable PT controlled by the signals delivered by the typewriter on the line 121. During each cycle, the energization of the bistable PT causes the tag bit B1 of the register M to shift by one decimal place from the initial place, defined during the state P97 of the machine, towards the first decimal place of said register.

The deenergization of the bistable PT enables the space command to be transmitted via the gate 146 on the line 128.

The successive decimal places of the register M are indicated by counting cycles carried out with the counter formed by the bistables K5, K6, K7, K8 of the register K closed on the adder 72 and which is controlled by the signal T5 of each digit period. Each cycle of counting the digit periods begins with the register K zeroized and in correspondence with the decimal place following that indicated by the tag bit B1 of the register M.

The counter K moreover executes a double count in correspondence with the first sexagesimal carry and stops in correspondence with the second hexagesimal carry. As the capacity of the store registers is 32 digits, the stopping of the counter K indicates the decimal place in the store which is adjacent that indicated by the tag bit B1 of the register M in the direction from the most significant digits to the least significant digits. The tag bit B1 of the register M is shifted into this decimal place. The step-by-step tabulation terminates with the cycle following that in which the tag bit B1 of the register M reaches the first decimal place of the register.

The instructions which have been described are capable of carrying into effect any tabulation program where the horizontal tabulation is prearranged by means of the sequence of instructions F3.2 (Carriage return), F3.3. (Prearrange tabulation), F3.4 (Set tabulation) and controlled by the instruction F3.5 (Horizontal tabulation), and where the vertical tabulation is controlled by the instructions F3.2 (Carriage return) and F3.3 (Prearrange tabulation).

Variations in the line-spacing can be obtained by means of a plurality of consecutive instructions F3.2 (Carriage return); in similar manner, by the setting of the tabulation stops, it is possible to obtain different horizontal-tabulation formats with consecutive instructions F3.5 (Horizontal tabulation).

For a complete change of the tabulation format, a different prearrangement of the line-spacing and of the carriage-return stops on the typewriter and the introduction into the store of new tabulation programs prerecorded on magnetic cards, as described hereinafter, are effected.

The computer is equipped with a card recording and reading device, the cards, for example, being magnetic cards of the type described in U.S. Pat. application Ser. No. 435,828.

The capacity of each card is equal to the total capacity of the five registers I, J, Q, E and D.

The effect of introducing the card into the reading device, as described in the above-mentioned patent application, is to transfer the information recorded on the card in order to the five registers aforesaid. As has been said, the two registers I and J are specialized to contain program instructions, while the remaining registers Q, E and D may contain, at choice, either instructions or data to be processed.

A program may therefore, depending upon its length, fill either the first two, or the first three, or the first four or all five of the aforesaid registers, the remaining registers and the corresponding zones of the cards being available each time for containing data to be processed.

As described in the said patent application, the manual operation of introducing a card into the reader automatically causes the introduction in order of all the contents of the card into the store registers.

In the present computer, it is moreover possible, at the choice of the operator, to make use of cards with a reduced storage capacity, equivalent more particularly to that of only two registers. This is achieved by the depression of a relevant card partialization key SP. During the phases of recording and reading a card, the successive scanning of five registers I, J, Q, D and E is obtained by means of the counter *h* hereinbefore described, which addresses them in order. Operation with partialized cards is determined by the fact that the pushbutton SP compels the aforesaid counter to begin counting starting from the address of the register D, whereby only the registers D and E are concerned in the phases of recording and reading said card, which is therefore partialized.

The partialized card can be used for entering in the internal store LDR a subprogram of the main program, entered beforehand in the store by the use of a nonpartialized card.

It is therefore clear that each partialized card is adapted to contain a given subprogram which is permanently available to the operator, whereby it is possible to form beforehand a collection or library of subprograms alongside the collection of programs constituted by the nonpartialized cards.

It is clear that, by the simple operation of introducing a partialized card manually into the reader, the partialized card causes the recording of the corresponding subprogram in a predetermined zone of the internal store LDR, in such manner, that without any need for further operations, the subprogram is immediately available for being executed.

The moment when the operator is able to introduce a subprogram in the above-mentioned manner is determined by a stop instruction contained in the main program.

What is claimed is:

1. A computing system having an output printer comprising:
  a storage means for containing print length instructions and data to be printed, said storage means including a predetermined register means for containing a tag bit where the location of said tag bit in said predetermined register determines the print length;
  an instruction register means for receiving said print length instructions, an input of said instruction register being connected to an output of said storage means;
  counter means for determining said location of said tag bit in accordance with said print length instructions received by said instruction register, an input of said counter being connected to an output of said instruction register; and
  means, connected between said counter and said storage, for writing said tag bit into said location determined by said counter means.

2. A data processor, having an output printer, comprising:
  a storage means, said storage means including a predetermined register means for containing a tag bit where the location of said tag bit in said predetermined register determines the number of decimal places to be printed;
  input means for selecting the number of decimal places to be printed;
  counter means for determining said location of said tag bit in accordance with said number selected by said input means, said input means being connected to said counter; and
  means, connected between said counter and said storage, for writing said tag bit into said location determined by said counter.

3. A computing system-printer combination including automatic and manual tabulation control comprising:
  a storage means for containing tabulation instructions and data to be printed, said storage means including a predetermined register for containing a tag bit, the location of said tag bit in said predetermined register determining the tabulation length;
  a printer having connected thereto manual means for controlling tabulation and manual means for entering information to be printed;
  an instruction register means for receiving said tabulation instructions from said storage means, said instruction register being connected to said printer in parallel with said manual means for controlling tabulation;
  an intermediate output store means for receiving said data to be printed from said storage means, said intermediate output store means being connected to said printer in parallel with said manual means for entering information;
  counter means for determining said location of said tag bit in accordance with said tabulation instructions received by said instruction register;
  means for connecting an output of said instruction register to an input of said counter; and means, connected between said counter and said storage, for writing said tag bit into said location determined by said counter means.

4. A system according to claim 3 wherein:

said counter comprises a shift register and an adder with the output of said shift register connected to an input of said adder and the output of said adder connected to the input of said shift register so as to form a closed loop; and wherein, an indication of the desired tabulation length is inserted into said shift register by means of said means for connecting an output of said instruction register to an input of said counter.

5. A system according to claim 4 including:

means, connected between said printer and said storage and responsive to said printer, for shifting said tag bit in said predetermined register.

6. A computing-printing arrangement comprising:

a storage means for containing printing instructions, including print length instructions, and data to be printed, said storage means including a first and a second predetermined register for containing a first and second tag bit, the location of said first tag bit determining the number of decimal places to be printed and the location of said second tab bit determining the print length;

an instruction register means for receiving said print length instructions from said storage, said instruction register being connected to said storage;

input means for selecting the number of decimal places to be printed;

counter means for determining, during a first time period, said location of said first tag bit in accordance with said number selected by said input means and, during a second time period, said location of said second tag bit in accordance with said print length instructions received by said instruction register;

means for connecting an output of said input means to an input of said counter;

means for connecting an output of said instruction register to an output of said counter; and means, connected between said counter and said storage for writing said tag bits into said location as determined by said counter.

7. A data processor, having an output printer provided with tabulation stops settable at selectable printing positions to establish a printing format and comprising:

storage means for storing data to be printed and tabulation and printing instructions, said tabulation instructions including instructions for setting tabulation stops at printing positions specified by said tabulation instructions;

means for indicating the instruction to be executed, said indicating means being supplied by said storage means;

means for setting tabulation stops in accordance with the instructions for setting tabulation stops indicated by said indicating means, and means for connecting said indicating means to said setting means.

8. A data processor according to claim 7, wherein said processor is provided with a reading device for reading a record member having recorded thereon a series of instructions including instructions for setting tabulation stops, said reading device being settable for supplying the read instructions to said storage means through transferring means which connect said reading means to said storage means.

9. A data processor, having an output device, comprising:

storage means containing a series of characters to be successively transferred to said output device, a movable tag bit being associated with the character currently designated to be transferred;

means supplied by said storage means with the character currently designated by said tag bit for transferring said character to said output device, and means responsive to the transmission of said character to said output device for shifting said movable tag bit in correspondence with the next character to be transferred.

10. A data processor, having an output printer providing a line of print having a predetermined maximum length comprising:

storage means comprising a plurality of registers each having a capacity greater than said length and at least one of said registers containing a series of characters to be printed successively by said printer, the character to be currently printed being indicated by a movable tag bit, said tag bit being located in said register at the location of said character;

means, supplied by said storage means with the character currently designated by said tag bit, for causing said printer to print said character;

means, responsive to the printing of said character by said printer for shifting said movable tag bit, to the location of the next character to be printed;

a second one of said registers having recorded therein a sign in a location, which location determined the maximum printing length, and means responsive to the occupation of corresponding locations by said movable tag bit and said sign in said first and second registers respectively, for interrupting the printing of characters, and causing automatically a return to the initial printing position, a line-spacing and a resumption of the printing of the subsequent characters in said series.